(12) United States Patent
Foster

(10) Patent No.: US 10,113,567 B1
(45) Date of Patent: Oct. 30, 2018

(54) HYDRAULIC CYLINDER WITH TAPER LOCK PISTON ASSEMBLY

(71) Applicant: Tim Foster, Lousville, KY (US)

(72) Inventor: Tim Foster, Lousville, KY (US)

( * ) Notice: Subject to any disclaimer, the term of this patent is extended or adjusted under 35 U.S.C. 154(b) by 233 days.

(21) Appl. No.: 14/964,040

(22) Filed: Dec. 9, 2015

Related U.S. Application Data

(60) Provisional application No. 62/089,717, filed on Dec. 9, 2014.

(51) Int. Cl.
*F15B 15/14* (2006.01)
*F16J 1/12* (2006.01)

(52) U.S. Cl.
CPC ...... *F15B 15/1447* (2013.01); *F15B 15/1428* (2013.01); *F16J 1/12* (2013.01)

(58) Field of Classification Search
CPC .............. F15B 15/1447; F16J 1/10; F16J 1/12
See application file for complete search history.

(56) References Cited

U.S. PATENT DOCUMENTS

| | | | | |
|---|---|---|---|---|
| 1,789,318 A | * | 1/1931 | McMahon | F04B 53/143 92/247 |
| 2,188,106 A | * | 1/1940 | Caldwell | F16J 15/3252 277/437 |
| 2,216,291 A | * | 10/1940 | Caldwell | F16J 1/008 92/241 |
| 2,249,400 A | * | 7/1941 | Shimer | F04B 53/143 92/244 |
| 2,557,497 A | * | 6/1951 | Carney | F04B 39/042 277/485 |
| 2,677,581 A | * | 5/1954 | Taylor, Jr. | F04B 53/143 277/437 |
| 2,815,992 A | * | 12/1957 | Rodgers | F16J 1/008 92/244 |
| 3,326,092 A | * | 6/1967 | Murphy | F16J 15/166 92/158 |
| 4,064,788 A | | 12/1977 | Rich et al. | |
| 4,281,590 A | * | 8/1981 | Weaver | F04B 53/143 277/437 |
| 4,630,958 A | | 12/1986 | McCallister | |
| 4,981,069 A | | 1/1991 | Matsui | |
| 6,386,088 B1 | | 5/2002 | Yoshimoto et al. | |
| 8,561,522 B2 | | 10/2013 | Funato et al. | |
| 2014/0331854 A1 | | 11/2014 | Coombs et al. | |

* cited by examiner

*Primary Examiner* — Thomas E Lazo
(74) *Attorney, Agent, or Firm* — R. Randall Frisk

(57) ABSTRACT

A hydraulic cylinder includes a cylinder assembly defining a cavity; a piston rod having an inboard end and a rod axis; a taper lock piston assembly including a piston head with a central bore and a head axis, and wherein the inboard end includes a first exterior tapered portion having a first non-zero cylinder taper angle and the central bore defines a piston tapered portion having a non-zero bore taper angle that is the same as the first cylinder taper angle; and wherein the piston head is received on the inboard end with the first exterior tapered portion in circumferential abutment with the piston tapered portion.

22 Claims, 3 Drawing Sheets

HYDRAULIC CYLINDER WITH TAPER LOCK PISTON ASSEMBLY

CROSS-REFERENCE TO RELATED APPLICATIONS

This application claims the benefit of Provisional Patent Application No. 62/089,717, filed Dec. 9, 2014, which application is hereby incorporated by reference in its entirety.

FIELD OF THE INVENTION

The present invention relates to the field of hydraulic cylinders, and more specifically, to a hydraulic cylinder with a piston rod and taper lock piston assembly.

BACKGROUND OF THE INVENTION

Hydraulic cylinders with internal piston and output shaft are commonly used to effect linear movement of an item that is connected to the output shaft. Although ruggedly built to withstand the task at hand, some cylinders may be subjected to such extraordinary repetition and/or pressure spikes that failure of the piston or rod (i.e. fracture) or failure of the connection between them can occur. In one example, vehicles configured for hauling heavy loads (e.g. 30 tons or more) may employ long (e.g. 60 or 80 inches or more) cylinders that may both move the load onto and off the vehicle, and hold it in place during transport. Sudden acceleration or deceleration of the load or shaking thereof can be transmitted through the output shaft to the internal piston. Because the cylinder is in an idle state and its input/output valves are closed, the hydraulic fluid has nowhere to go, and the enormous pressure spike can and often does cause the aforementioned failure.

Improvements in such hydraulic cylinders to better resist, if not all but eliminate such failures is desired.

SUMMARY OF THE INVENTION

Generally speaking, the invention includes a hydraulic cylinder assembly with at least a portion of the inboard end of the piston rod and the inner surface of the piston head fixedly mounted thereon being tapered.

A hydraulic cylinder includes a cylinder assembly defining a cavity; a piston rod having an inboard end and a rod axis; a taper lock piston assembly including a piston head with a central bore and a head axis, and wherein the inboard end includes a first exterior tapered portion having a first non-zero cylinder taper angle and the central bore defines a piston tapered portion having a non-zero bore taper angle that is the same as the first cylinder taper angle; and wherein the piston head is received on the inboard end with the first exterior tapered portion in circumferential abutment with the piston tapered portion.

It is an object of the present invention to provide an improved piston and piston rod assembly for a hydraulic cylinder.

Further objects and advantages of the present invention will become apparent from the following description of the preferred embodiment

DESCRIPTION OF THE PREFERRED EMBODIMENT

Figure 1:
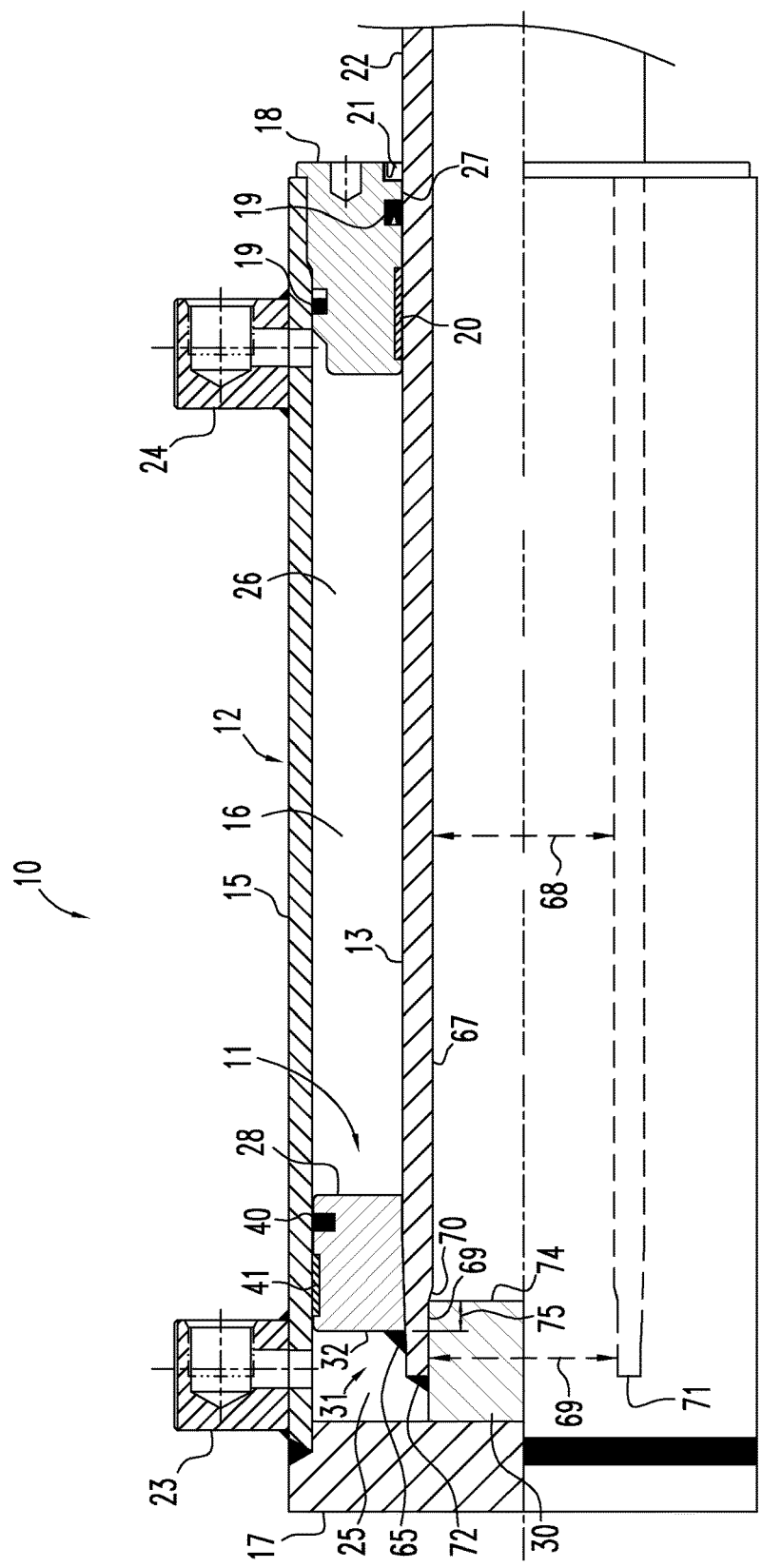
FIG. 1 is a side view, partly in cross-sectional, of a hydraulic cylinder 10 with taper lock piston 11 in accordance with one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and any alterations and modifications in the illustrated device, and further applications of the principles of the invention as illustrated therein are herein contemplated as would normally occur to one skilled in the art to which the invention relates.

Referring to FIG. 1, there is shown a hydraulic cylinder 10 with taper lock piston assembly 11 in accordance with one embodiment of the present invention. Hydraulic cylinder 10 is a bi-directional or double acting cylinder, but alternative embodiments are contemplated wherein the taper lock piston assembly 11 is used in single acting hydraulic cylinders. Hydraulic cylinder 10 generally includes a cylinder assembly 12, a piston rod 13 and the taper lock piston assembly 11. Cylinder assembly 11 includes a cylinder body 15 with a cavity 16, an end cap 17 fixed to close off the forward end of cylinder body 15 as by welding, a gland 18 inserted into the cavity 16 and closing off the opposite end of cylinder body 15, and various seals, wear rings and wipers (e.g. at 19, 20 and 21, respectively), as is known in the industry. Piston rod 13 extends from its outboard end 22, through a central opening 27 defined in gland 18 and into cavity 16 where, at its forward, in board end 31, there is affixed piston head 28, as described herein. As is known for such double acting pistons, the piston rod 13 and piston head 28 combination move as a unit relative to cylinder body 15 between a retracted position (shown in FIG. 1) and an extended position (not shown). The outboard end 22 of piston rod 13 may extend 60, 80 or more inches rearwardly (to the right as viewed in FIG. 1) of cylinder body 15, though such length is not shown in FIG. 1.

Forward and rearward input ports 23 and 24 provide for the entry and exit of hydraulic fluid to the opposing forward and rearward hydraulic chambers 25 and 26, as described herein. As shown, a forward chamber 25 is defined in cavity 16 by cylinder body 15, end cap 17, piston head 28, piston rod 13 and plug 30, and a rearward chamber 26 is defined in cavity 16 on the opposite side of piston head 28 by cylinder body 15, gland 18, piston head 28 and piston rod 13. Hydraulic fluid pumped into port 23 (by a suitable pump and fluid source, not shown) while fluid is simultaneously permitted to exit port 24 moves piston head 28 and the piston rod 13 connected thereto to the right (as shown in FIG. 1) so that the outboard end 22 of piston rod 13 is moved to the right (the extended position). Conversely, pumping hydraulic fluid into port 24 while fluid is simultaneously permitted to exit port 23 moves piston head 28 and the piston rod 13 connected thereto to the left (as shown in FIG. 1) so that the outboard end 22 of piston rod 13 is retracted. This is a bi-directional or double acting cylinder.

Figure 2:
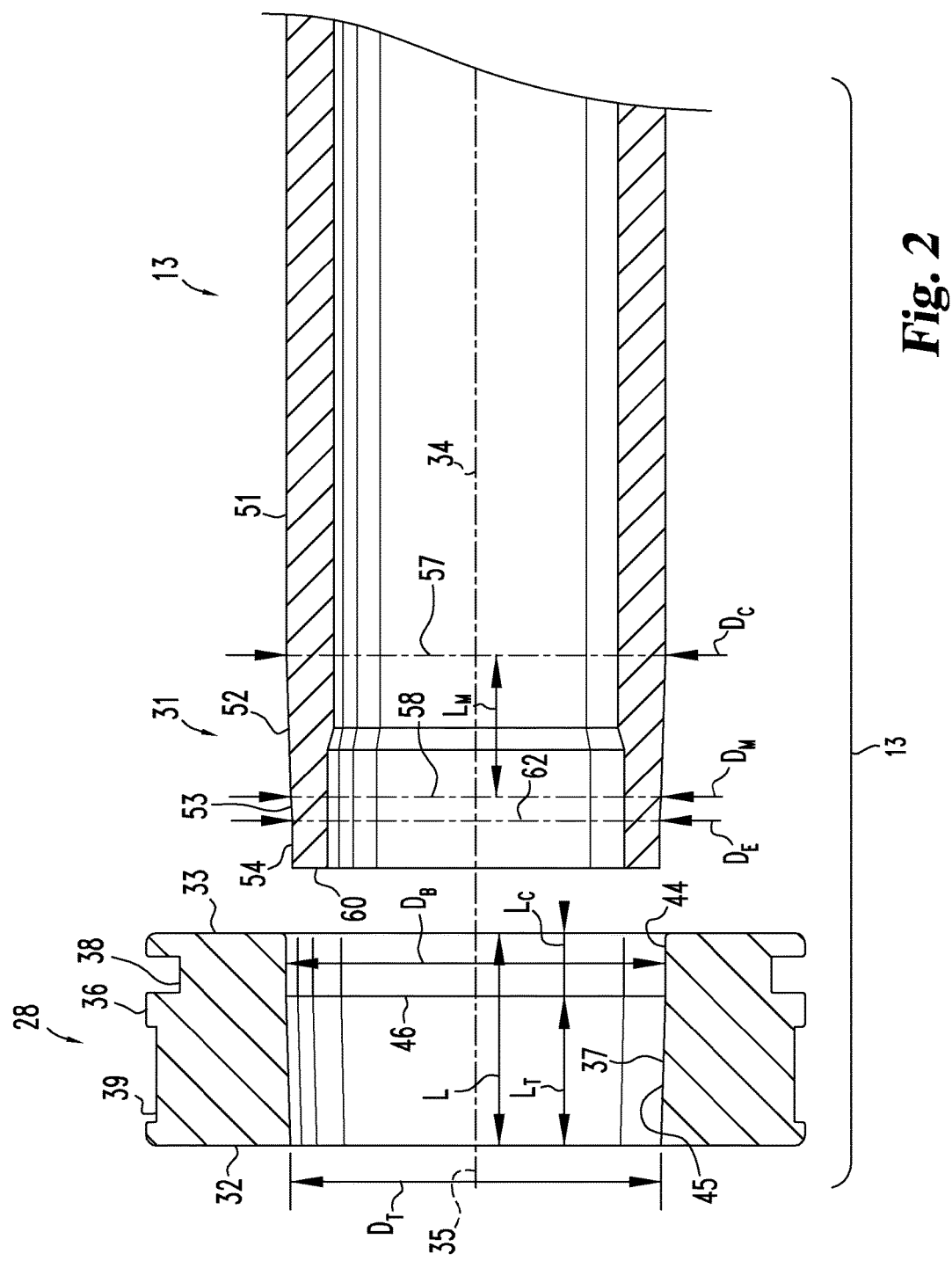
FIG. 2 is a side, exploded and cross-sectional view of the inboard end 31 of piston rod 13 and of piston head 28 of the hydraulic cylinder 10 with taper lock piston 11 of FIG. 1.
Figure 3:
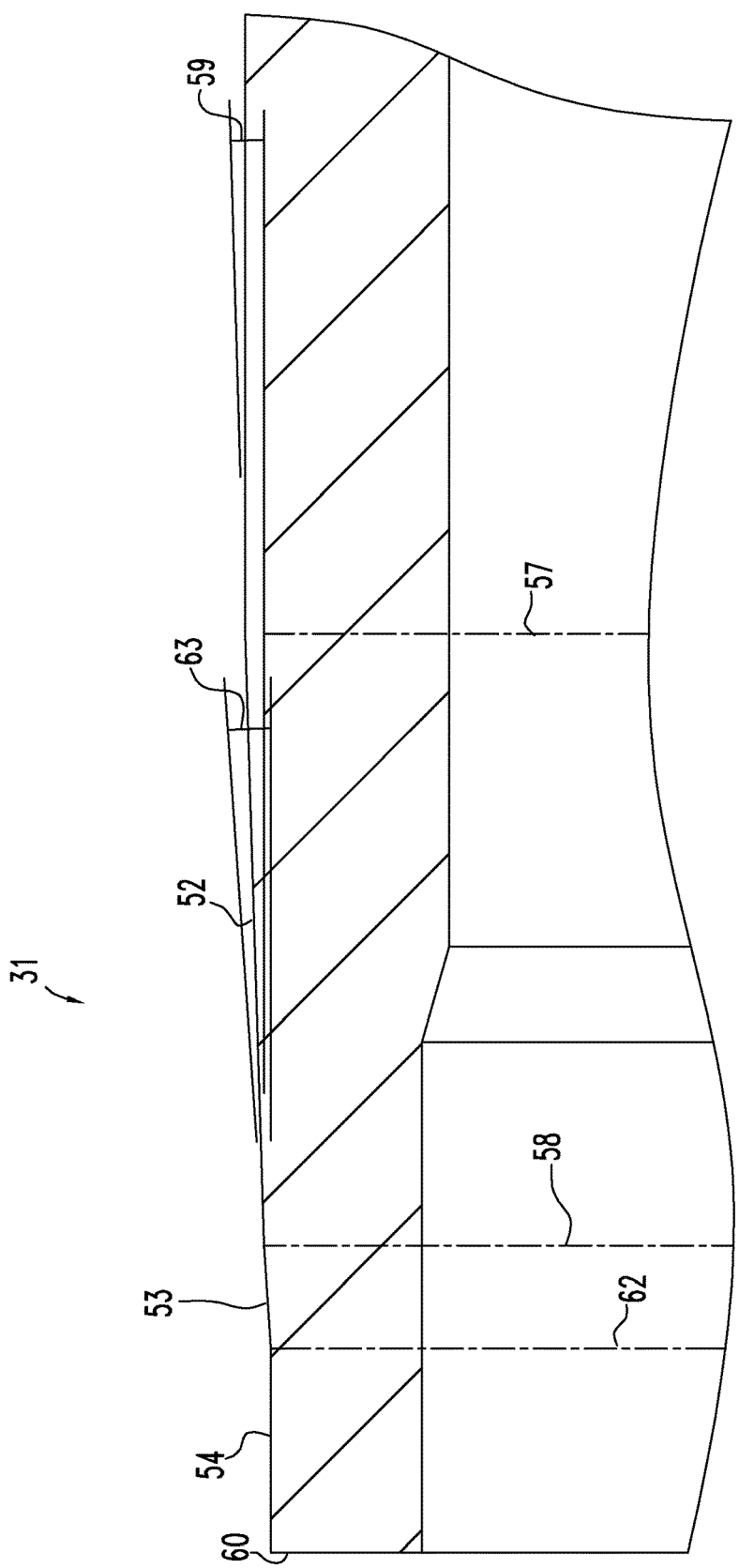
FIG. 3 is an enlarged side, cross-sectional view of a portion of the inboard end 31 of the piston rod 13 of the hydraulic cylinder 10 with taper lock piston 11 of FIG. 2.

Referring to FIGS. 1, 2 and 3, taper lock piston assembly 11 includes a piston head 28, plug 30 and a sizing and configuration of the inboard end 31 of piston rod 13 and of the central bore 37, as described. Piston head 28 has forward and rearward faces 32 and 33, an outer cylindrical surface 36 and a central bore 37. Defined in the outer surface 36 are annular recesses 38 and 39 that are sized for receipt of a seal 40 and rear ring 41, as shown. In the embodiment of FIG. 2, the length L of central bore 37 between opposing faces 32 and 33 is about 2.25 inches, but only a portion 44 of that length, from rearward face 33 toward forward face 32, is uniformly cylindrical with a diameter $D_B$ of about 4.005 inches. The remaining portion 45 (piston tapered portion 45) is frustoconical, extending from a bore junction circle 46 (where portions 44 and 45 intersect) and tapering at a bore taper angle of about 1.72 degrees from the diameter $D_B$ (at circle 46) down to a diameter $D_T$ of about 3.9098 inches where it intersects with forward face 32. The taper angles referred to herein are of course relative to lines parallel to the axes of the piston rod 13 (the rod axis 34) and the piston head 28 (the head axis 35), which axes 34 and 35 naturally coincide when piston head 28 is mounted to piston rod 13, as shown. The axial length $L_C$ of the cylindrical portion 44 is about 0.6677 inches and the axial length $L_T$ of the piston tapered portion 45 is about 1.5823 inches, the piston tapered portion 45 constituting about 70% (($L_T$/L)×100) of the axial length of central bore 37. Alternative embodiments are contemplated wherein the entire length L of central bore 37 is tapered. At least about 65% of such axial length ($L_T$) is desired to be tapered; and in the preferred embodiment, 70% to 90% is tapered.

Alternative embodiments are contemplated wherein, when less than the entire length L of central bore 37 is tapered, the non-tapered portion (as at 44) instead intersects with the forward face 32, or there is a non-tapered portion intersecting both the rearward and forward faces 32 and 33 and the tapered portion is in the middle. Alternative embodiments are contemplated wherein the bore taper angle is as little is about 1.0 degree and up to about 3.0 degrees, with the preferred embodiment being between about 1.7 degrees and 2.0 degrees.

The inboard end 31 of piston rod 13 is also tapered whereby it can be matingly received within central bore 37 of piston head 28. Piston rod 13 has a uniform cylindrical portion 51, a first exterior tapered portion 52, a second exterior tapered portion 53 and an end portion 54. In the embodiment of FIG. 2, the uniformly cylindrical portion 51 has a diameter $D_C$ of about 4.000 inches. The first tapered portion 52 is frustoconical, extending from a first cylinder taper circle 57 (where portions 51 and 52 intersect), and tapering at a first cylinder taper angle 59 of about 1.72 degrees from the diameter $D_C$ (at circle 57) down to a diameter $D_M$ at second cylindrical taper circle 58 (where portions 52 and 53 intersect) of about 3.9098 inches—that is, the same diameter as diameter $D_T$ of central bore 37 at the forward face 32 of piston head 28. The length $L_M$ of portion 52 (that is, the axial distance between first and second cylinder taper circles 57 and 58) is the same as or slightly less than the length $L_T$ of tapered portion 45 of piston head 28.

The end portion 54 is uniformly cylindrical and is about 0.5 inches long from the innermost end 60 of piston rod 13 to the third cylindrical taper circle 62 (where portions 53 and 54 intersect). End portion 54 and the third cylindrical taper circle 62 have a diameter $D_E$ of about 3.875 inches. This diameter $D_E$ (about 3.875 inches) at the end of piston rod 13 is slightly smaller than the smallest diameter $D_T$ (3.9098 inches) of central bore 37, this clearance enabling piston head 28 to be easily slid onto the end of piston rod 13. The resulting second cylinder taper angle 63 of portion 53 (between second and third cylindrical taper circles 58 and 62) is thus about 3.98 degrees. Alternative embodiments are contemplated wherein second portion 52 continues at the same angle all the way into end portion 54, in which case there is no third portion 53 nor third cylindrical taper circle 62.

In assembly, piston head 28 is slid onto the end 31 of piston rod 13 until the piston tapered portion 45 of central bore 37 engages with the first tapered portion 52 of piston rod 13. Because the angles of piston tapered portion 45 and first tapered portion 52 are the same and so small (that is, close to, but greater than zero degrees), there is a natural wedging or locking effect that acts to hold the piston locked to the piston rod. The effect is arguably the greatest when the area of contact between the piston head 28 and piston rod 13 is the greatest and, thus, when the entire length of central bore 37 is tapered and the corresponding outer portion of piston rod 13 is tapered an equal length to match. For reasons relating to ease of manufacture, assembly, and/or maintenance, it may be desirable to leave some portion(s) of central bore 37 with a straight turn (i.e. not tapered) as at portion 44, as described above.

Once firmly pushed up, onto the inboard end 31 of piston rod 13, piston head 28 is rigidly and fixedly secured to piston rod 13 by appropriate means such as welding, as at 65. The wedge-related locking action between piston head 28 and piston rod 13 acts with the weld 65 to provide a considerably stronger bond between piston head and rod, which significantly resists failure due to hydraulic force input spikes.

In the embodiment of FIG. 1, piston rod 13 is hollow, having a central bore 67 with a main diameter (at 68) of about 3.00 inches and a larger inner diameter (at 69) of about 3.133 inches, the latter extending only a portion of the way in from the innermost end 71. The transition (at 70) between the portions 68 and 69 preferably forms a tapered portion (i.e. about 45 degrees, as shown) as opposed to a sharply angled (i.e. about 90 degrees) step or ledge. The larger, inner diameter 69 is substantially the same as the outer diameter of plug 30. Thus, when plug 30 is inserted into the hollow inboard end 31 of piston rod 13, as shown, it is moved into the piston rod central bore 67 until it contacts transition 70. Plug 30 is then secured in that position to piston rod 13 by appropriate means such as welding, as at 72. Plug 30 extends into the rod's central bore 67 at least enough to overlap (at 75) piston head 28. That is, in assembly, the rearward face 74 of plug 30 is disposed rearwardly of the forward face 32 of piston head 28. This overlap 75 is about 0.3 inches in the embodiment of FIG. 1. Plug 30 thus provides support for any radially inwardly directed force component that might result from pressure spikes encountered by piston head 28, and translated by virtue of the angled abutment of angled portions 45 and 52 of piston head 28 and piston rod 13, respectively. Alternative embodiments are contemplated wherein the overlap 75 is less (down to about zero inches—that is, faces 32 and 74 are roughly aligned) or greater (that is, up to the full length of piston head 28 where overlap 75 equals the full length L of central bore 37 of piston head 28, or greater, if desired. With such overlap (of between 0 inches and up to the length of piston head 29 or more), the wall thickness of piston rod 13 can be concordantly thinner. Thus, ¼ inch wall thickness could be reduced to 7/32 inch or 3/16 or less, depending on the use to which the hydraulic cylinder is put.

In one embodiment, piston rod 13 is made of 1026 steel and piston head 29 and plug 30 are made of 1018 steel. Alternative embodiments are contemplated wherein any of these components could be made of other materials. For example and with limitation, piston head 29 could be made of aluminum, in which case a steel collar (not shown) could be received over the forward end 31 of piston rod 13, generally around portion 54 and tightly up against the forward face 32 of piston head 29 so that the aluminum piston head 29 would achieve the same wedge-related locking action between piston head 28 and piston rod 13. The collar (not shown) would then be fixedly and rigidly connected to piston rod 13 by appropriate means such as welding.

Alternative embodiments are contemplated wherein plug 30 may be replaced by having at least the forward, inboard end 31 of piston rod 13 not being hollow, but instead filled with the same or any suitable other material, or having piston rod 13 be a solid, non-hollow piece.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A hydraulic cylinder, comprising:
    a cylinder assembly defining a cavity;
    a piston rod having an inboard end and a rod axis;
    a taper lock piston assembly including a piston head with
        a central bore and a head axis, and wherein the inboard end includes a first exterior tapered portion having a first non-zero cylinder taper angle and a second exterior tapered portion having a second non-zero cylinder taper angle that is different than the first cylindrical taper angle and the central bore defines a piston tapered portion having a non-zero bore taper angle that is the same as the first cylinder taper angle; and
    wherein the piston head is received on the inboard end with the first exterior tapered portion in circumferential abutment with the piston tapered portion.

2. The hydraulic cylinder of claim 1 wherein the first cylinder taper angle is between about 0.5 and 3.0 degrees.

3. The hydraulic cylinder of claim 2 wherein the first cylinder taper angle is between about 1.0 and 2.5 degrees.

4. The hydraulic cylinder of claim 3 wherein the first cylinder taper angle is about 1.72 degrees.

5. The hydraulic cylinder of claim 1 wherein the central bore has an axial length and the piston tapered portion is tapered along the entire axial length.

6. The hydraulic cylinder of claim 1 wherein the central bore has an axial length and the piston tapered portion is tapered along between 70 and 90 percent of the axial length.

7. The hydraulic cylinder of claim 1 wherein the central bore has an axial length and the piston tapered portion is tapered along at least about 65 percent of the axial length.

8. The hydraulic cylinder of claim 1 wherein the first exterior tapered portion has a maximum diameter of about 4.0 units; the first cylinder taper angle is about 1.72 degrees; the axial length L of the central bore is at least about 2 units; and the axial length of the piston tapered portion is at least about 1.3 units.

9. The hydraulic cylinder of claim 1 wherein the piston head is rigidly and fixedly secured to the piston rod.

10. A hydraulic cylinder, comprising:
    a cylinder assembly defining a cavity;
    a piston rod having an inboard end and a rod axis;
    a taper lock piston assembly including a piston head with
        a central bore and a head axis, and wherein the inboard end includes a first exterior tapered portion having a first non-zero cylinder taper angle and the central bore defines a piston tapered portion having a non-zero bore taper angle that is the same as the first cylinder taper angle;
    wherein the piston head is received on the inboard end with the first exterior tapered portion in circumferential abutment with the piston tapered portion; and
    wherein said piston rod defines a central bore at its inboard end and said taper lock piston assembly further includes a plug sized for receipt in the central bore.

11. The hydraulic cylinder of claim 10 wherein the first cylinder taper angle is between about 0.5 and 3.0 degrees.

12. The hydraulic cylinder of claim 11 wherein the first cylinder taper angle is between about 1.0 and 2.5 degrees.

13. The hydraulic cylinder of claim 12 wherein the first cylinder taper angle is about 1.72 degrees.

14. The hydraulic cylinder of claim 10 wherein the central bore has an axial length and the piston tapered portion is tapered along the entire axial length.

15. The hydraulic cylinder of claim 10 wherein the central bore has an axial length and the piston tapered portion is tapered along between 70 and 90 percent of the axial length.

16. The hydraulic cylinder of claim 10 wherein the central bore has an axial length and the piston tapered portion is tapered along at least about 65 percent of the axial length.

17. The hydraulic cylinder of claim 10 wherein the first exterior tapered portion has a maximum diameter of about 4.0 units; the first cylinder taper angle is about 1.72 degrees; the axial length L of the central bore is at least about 2 units; and the axial length of the piston tapered portion is at least about 1.3 units.

18. The hydraulic cylinder of claim 10 wherein the piston head is rigidly and fixedly secured to the piston rod.

19. The hydraulic cylinder of claim 10 wherein the plug is secured to the piston rod.

20. The hydraulic cylinder of claim 19 wherein the plug extends into the central bore enough to overlap the piston head.

21. The hydraulic cylinder of claim 20 wherein the overlap is at least equal to the axial length.

22. The hydraulic cylinder of claim 19 wherein the plug extends into the central bore but does not overlap the piston head.

* * * * *